US011839809B2

(12) United States Patent
Kim (10) Patent No.: US 11,839,809 B2
(45) Date of Patent: Dec. 12, 2023

(54) OPERATING DEVICE

(71) Applicant: KORTEK CORPORATION, Incheon (KR)

(72) Inventor: Jin Seok Kim, Seoul (KR)

(73) Assignee: KORTEK CORPORATION, Incheon (KR)

( * ) Notice: Subject to any disclaimer, the term of this patent is extended or adjusted under 35 U.S.C. 154(b) by 112 days.

(21) Appl. No.: 17/599,775

(22) PCT Filed: Mar. 10, 2020

(86) PCT No.: PCT/KR2020/003328
§ 371 (c)(1),
(2) Date: Sep. 29, 2021

(87) PCT Pub. No.: WO2020/204378
PCT Pub. Date: Oct. 8, 2020

(65) Prior Publication Data
US 2022/0126197 A1 Apr. 28, 2022

(30) Foreign Application Priority Data

Apr. 4, 2019 (KR) .................. 10-2019-0039529
Aug. 5, 2019 (KR) .................. 10-2019-0094759

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
None
See application file for complete search history.

(56) References Cited

U.S. PATENT DOCUMENTS

| 6,149,235 A | 11/2000 | Fahim |
| D780,860 S | 3/2017 | Jones |

(Continued)

FOREIGN PATENT DOCUMENTS

| AU | 2018204595 A1 | 3/2019 |
| JP | 2003-308756 A | 10/2003 |

(Continued)

OTHER PUBLICATIONS

PCT International Search Report for PCT Application No. PCT/KR2020/003328, dated Jun. 18, 2020.

*Primary Examiner* — Peter J Iannuzzi
(74) *Attorney, Agent, or Firm* — Schmeiser, Olsen & Watts, LLP (57) ABSTRACT

Provided is an operation device including: an operation portion inserted into an insertion hole portion of a glass portion; a frame portion equipped with an inner hole portion into which the operation portion is inserted; a rotation portion rotatably installed on the frame portion; a first locking part connected by the rotation portion and a link member, and moved together with the link member so as to be attached to and detached from one side of the operation portion; a second locking part installed in a position opposite to the first locking part with the operation portion interposed therebetween, and moved together with the first locking part so as to be attached to and detached from the other side of the operation portion; and a rotating connecting portion rotatably installed to the frame portion and to which the first locking part and the second locking part are rotatably connected.

8 Claims, 5 Drawing Sheets

(56) References Cited

U.S. PATENT DOCUMENTS

| | | | |
|---|---|---|---|
| 11,378,996 B2* | 7/2022 | Lee | H01H 13/10 |
| 2015/0167827 A1* | 6/2015 | Fett | F16H 59/02 |
| | | | 74/473.3 |
| 2015/0303658 A1 | 10/2015 | Wu et al. | |
| 2017/0175884 A1* | 6/2017 | Watanabe | F16H 61/24 |
| 2018/0320780 A1* | 11/2018 | Heo | F16H 59/02 |
| 2018/0363774 A1* | 12/2018 | Yamamoto | F16H 61/22 |
| 2019/0015743 A1 | 1/2019 | Strahle | |
| 2019/0211921 A1* | 7/2019 | Watanabe | F16H 61/22 |
| 2020/0063857 A1* | 2/2020 | Kim | F16H 59/12 |
| 2020/0182349 A1* | 6/2020 | Asahina | F16H 59/08 |
| 2021/0079998 A1* | 3/2021 | Nakanishi | F16H 59/08 |
| 2021/0247796 A1* | 8/2021 | Provini | G05G 5/05 |
| 2022/0171422 A1* | 6/2022 | Park | G05G 1/02 |
| 2022/0197326 A1* | 6/2022 | Park | H01H 13/10 |

FOREIGN PATENT DOCUMENTS

| | | |
|---|---|---|
| JP | 2017-012636 A | 1/2017 |
| KR | 20-0434973 Y1 | 7/2006 |
| KR | 10-2014-0031761 A | 3/2014 |
| KR | 10-2016-0038201 A | 4/2016 |
| WO | 2019235718 A1 | 12/2019 |

* cited by examiner

OPERATING DEVICE

CROSS-REFERENCE TO RELATED APPLICATIONS

This application claims priority to PCT Application No. PCT/KR2020/003328, having a filing date of Mar. 10, 2020, which claims priority to KR 10-2019-0094759, having a filing date of Aug. 5, 2019, and KR 10-2019-0039529, having a filing date of Apr. 4, 2019, the entire contents all of which are hereby incorporated by reference.

FIELD OF TECHNOLOGY

The following relates to an operating device, and more particularly, to an operating device that allows an operation part to be quickly and easily installed and disassembled.

BACKGROUND

In general, display units are installed in game devices, and operation parts are fixed to the display units. Push operation parts are connected to circuit boards by electrical wires, and as signals of the push operation parts are input to the circuit boards, specific functions are selected. Such push operation parts may fail due to impacts or the like.

However, in the conventional art, since the push operation part is fixed to the display unit, when repair is required due to a failure of the push operation part, operations of separating the entire display unit from the game device and then transporting the display unit to a repair company are required.

At the repair company, the operation part is repaired or replaced and then is sent to a client, and the display unit is reinstalled in the game device. Thus, maintenance costs and working time increase. Therefore, it is necessary to reduce this problem.

The background technology is disclosed in Korean Utility Model No. 20-0434973 (registered on Dec. 26, 2006, titled: Unmanned operating device of operation button of game console).

SUMMARY

An aspect relates to an operating device that allows an operation part to be quickly and easily installed and disassembled, thereby reducing maintenance costs.

An aspect of embodiments of the present invention provides an operating device including an operation part inserted into an insertion hole part of a glass part, a frame part having an inner hole part into which the operation part is inserted, a rotation part rotatably installed in the frame part, a first locking part connected to the rotation part by a link member and moving together with the link member to be detachably attached to one side of the operation part, a second locking part installed at a position opposite to the first locking part with the operation part interposed therebetween and moving together with the first locking part to be detachably attached to the other side of the operation part, and a rotation connection part which is rotatably installed in the frame part and to which the first locking part and the second locking part are rotatably connected.

The frame part may include a base part located below the glass part and having the inner hole part at a position facing the insertion hole part, and an extension frame part which extends from the base part and in which the rotation part is rotatably installed.

The rotation part may include a rotary shaft rotatably installed in the frame part, a rotation body which has a plate shape connected to the rotary shaft and to which the link member is rotatably connected, and a knob member which is installed in a curved shape extending from the rotation body and is rotated by receiving an external force.

The first locking part may include a first locking body which is installed in a shape surrounding one side surface of the operation part and has both ends rotatably connected to the rotation connection part, a first restraint part that protrudes from the first locking body and is caught by restraint groove parts provided in side surfaces of the operation part, and a side extension part which extends from the first locking body and to which the link member is rotatably connected.

The second locking part may include a second locking body which is installed in a shape surrounding the other surface of the operation part and has both ends rotatably connected to the rotation connection part, and a second restraint part that protrudes from the second locking body and is caught by the restraint groove parts provided in the side surfaces of the operation part.

Movement directions of the first locking part and the second locking part may be set according to a rotation direction of the rotation part, and the first locking part and the second locking part may be moved in a direction of becoming closer to each other or being spaced apart from each other with the operation part interposed therebetween.

The rotation connection part may include a rotation connection body rotatably installed in the frame part, a first support protrusion which protrudes from the rotation connection body and in which the first locking body is rotatably installed, and a second support protrusion which protrudes from the rotation connection body and in which the second locking body is rotatably installed.

The first support protrusion and the second support protrusion may be installed in opposite directions with respect to a rotation center axis of the rotation connection body.

In an operating device according to embodiments of the present invention, since a first locking part and a second locking part are moved by rotating a rotation part to easily release the restraint of an operation part, maintenance costs can be reduced and working time can be shortened.

Further, according to embodiments of the present invention, since only the operation part can be separated from a glass part and repaired or replaced, an operation of moving the glass part together with the operation part is omitted, and thus maintenance costs and work time for the operation part can be reduced.

BRIEF DESCRIPTION

Some of the embodiments will be described in detail, with reference to the following figures, wherein like designations denote like members, wherein.

DETAILED DESCRIPTION

Hereinafter, an operating device according to one embodiment of the present invention will be described with reference to the accompanying drawings. In this process, the thickness of lines or the size of components illustrated in the drawings may be exaggerated for clarity and convenience of description.

Further, terms described below are defined in consideration of functions in embodiments of the present invention and may change according to the intention or custom of a user or an operator. Therefore, definitions of these terms should be made based on the contents throughout the present specification.

Figure 1:
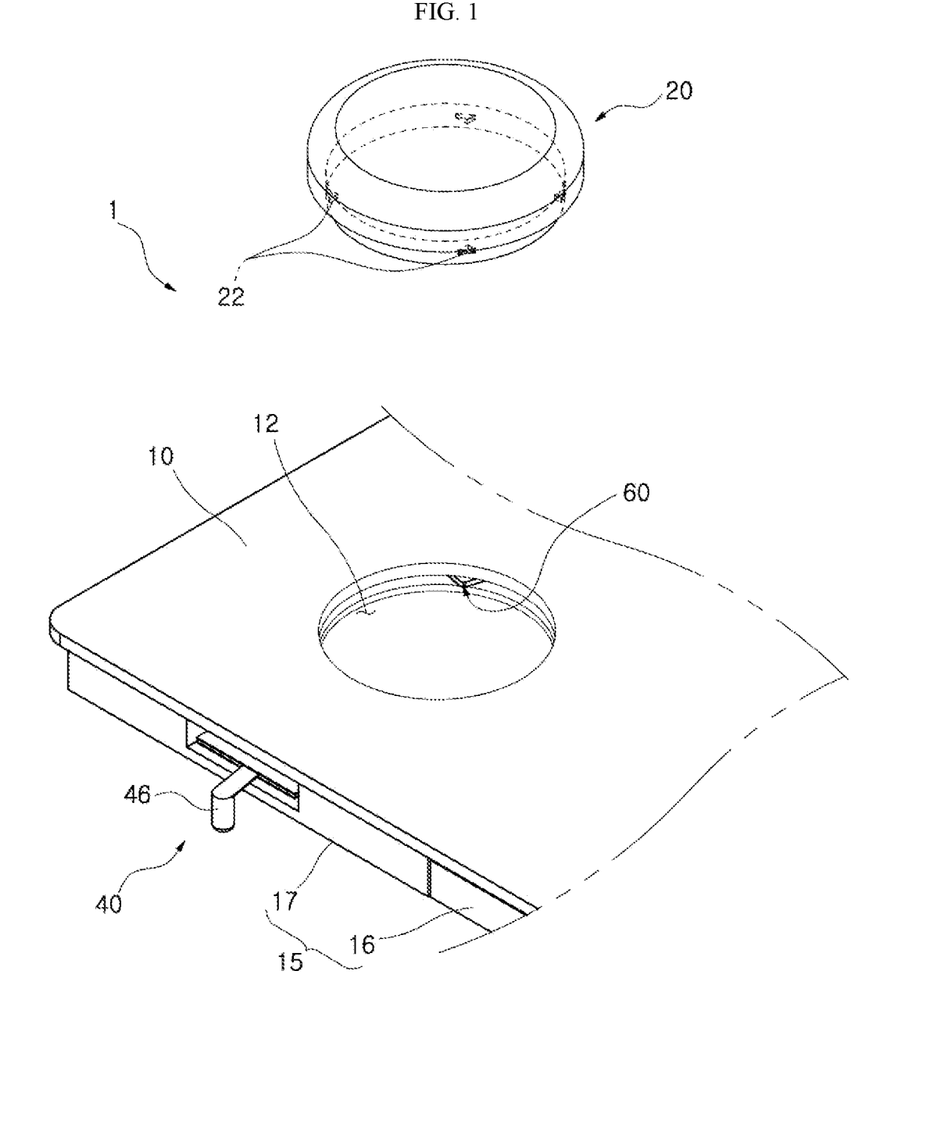
FIG. 1 is a perspective view illustrating a state in which an operation part is separated from an operating device according to one embodiment of the present invention.
Figure 2:
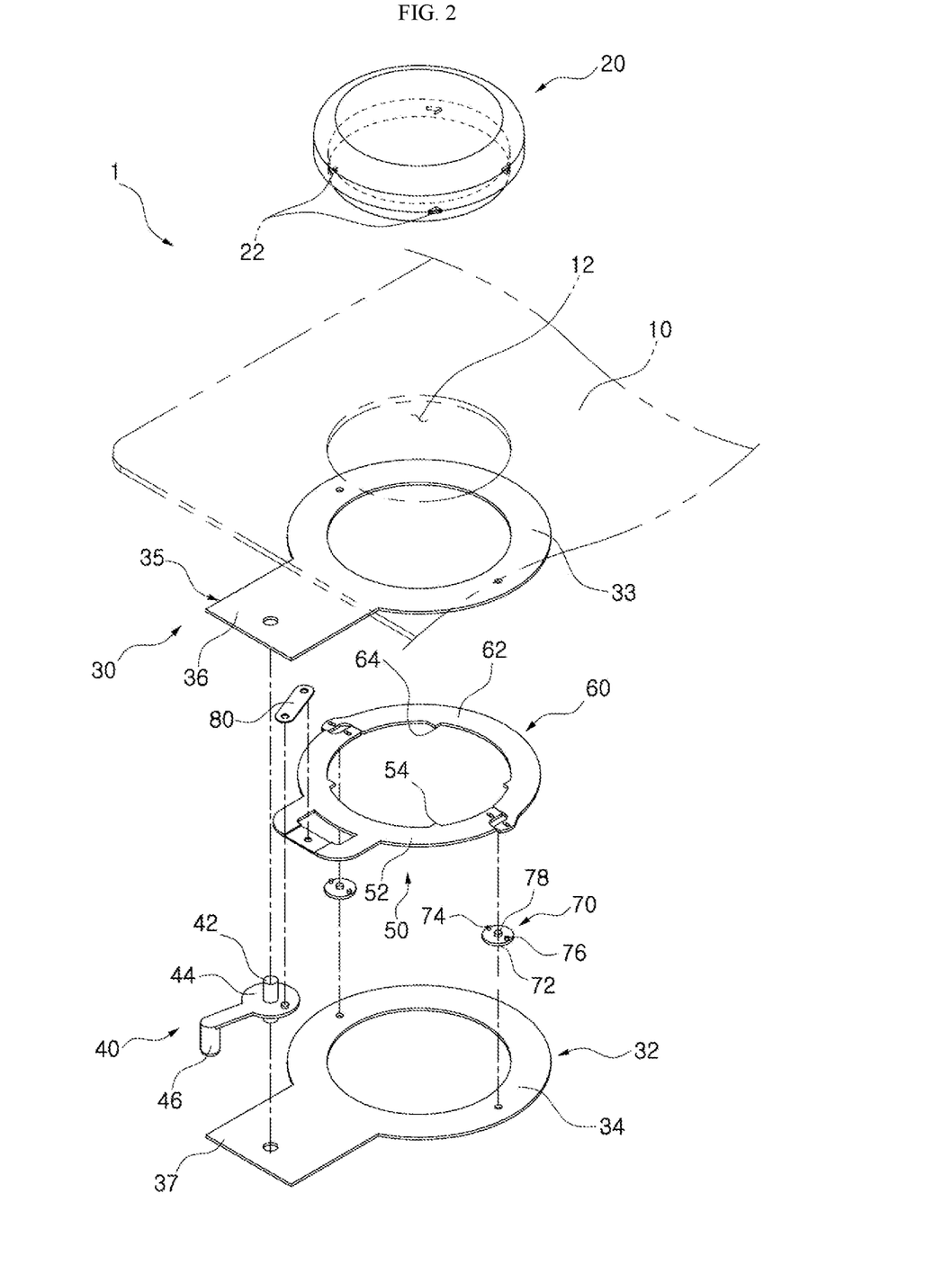
FIG. 2 is an exploded perspective view of the operating device according to one embodiment of the present invention.
Figure 3:
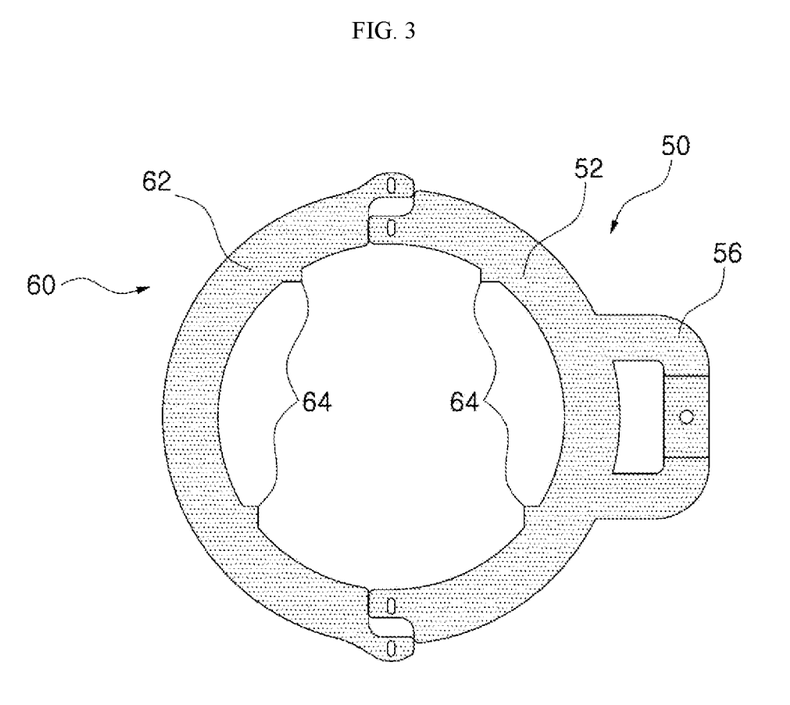
FIG. 3 is a plan view illustrating a first locking part and a second locking part according to one embodiment of the present invention.
Figure 4:
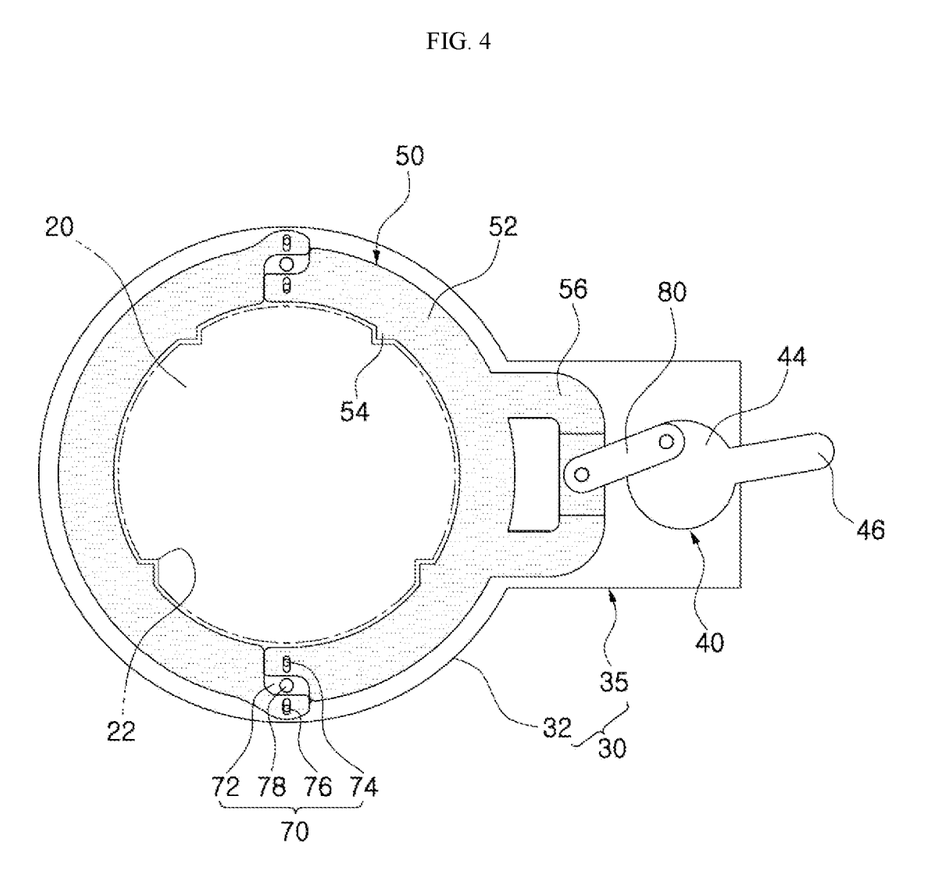
FIG. 4 is a view illustrating a state in which the first locking part and the second locking part restrict movement of the operation part according to one embodiment of the present invention.
Figure 5:
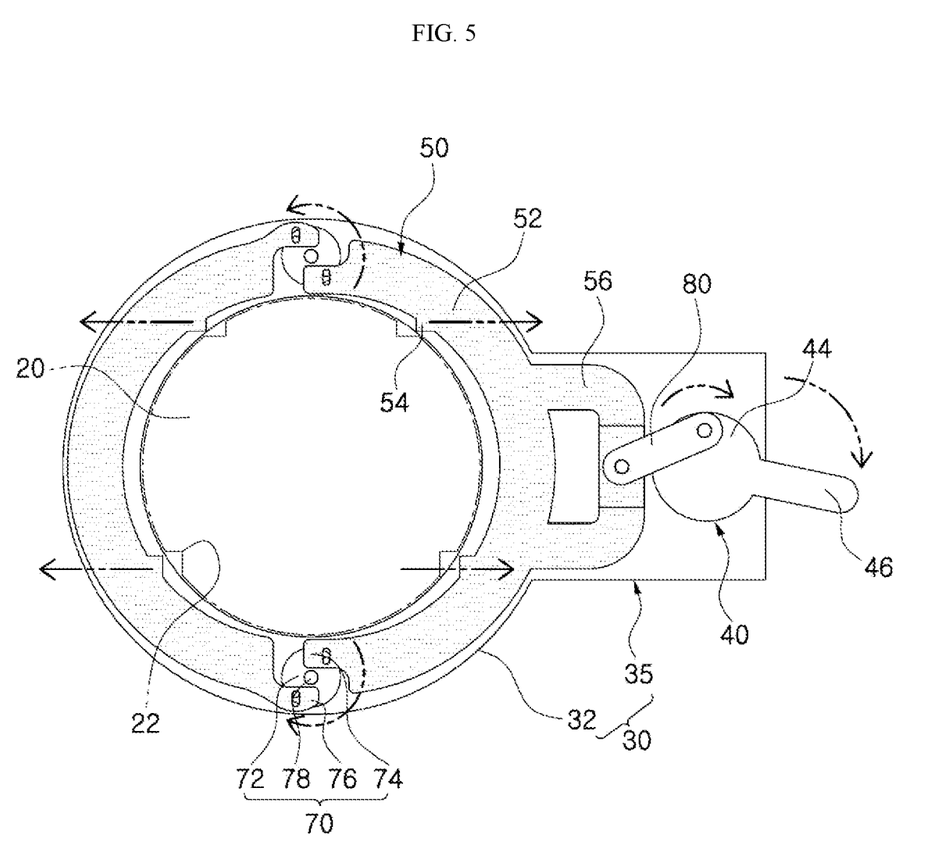
FIG. 5 is a view illustrating a state in which the operation part is unlocked by linear movement of the first locking part and the second locking part according to one embodiment of the present invention.

FIG. 1 is a perspective view illustrating a state in which an operation part is separated from an operating device according to one embodiment of the present invention, FIG. 2 is an exploded perspective view of the operating device according to one embodiment of the present invention, FIG. 3 is a plan view illustrating a first locking part and a second locking part according to one embodiment of the present invention, FIG. 4 is a view illustrating a state in which the first locking part and the second locking part restrict movement of the operation part according to one embodiment of the present invention, and FIG. 5 is a view illustrating a state in which the operation part is unlocked by linear movement of the first locking part and the second locking part according to one embodiment of the present invention.

As illustrated in FIGS. 1 to 5, an operating device 1 according to one embodiment of the present invention includes an operation part 20 inserted into an insertion hole part 12 of a glass part 10, a frame part 30 having an inner hole part into which the operation part 20 is inserted, a rotation part 40 rotatably installed in the frame part 30, a first locking part 50 which is connected to the rotation part 40 by a link member 80 and moves together with the link member 80 to be detachably attached to one side of the operation part 20, a second locking part 60 which is installed at a position opposite to the first locking part 50 with the operation part 20 interposed therebetween and moves together with the first locking part 50 to be detachably attached to the other side of the operation part 20, and a rotation connection part 70 which is rotatably installed in the frame part 30 and to which the first locking part 50 and the second locking part 60 are rotatably connected.

As one embodiment, the operating device 1 may be applied to a button device used in a casino machine or the like.

A display unit 15 includes a display panel 16 that outputs an image and a mounting housing part 17 forming a space, in which the frame part 30 is installed, on one side of the display panel 16. The plate-shaped glass part 10 is disposed in front of the display unit 15 and the mounting housing part 17.

The glass part 10 is installed to be spaced apart from the display unit 15 to secure visibility. Further, the insertion hole part 12 is formed in the glass part 10 so that the operation part 20 is insertable thereinto. Since the insertion hole part 12 is formed in the same shape as the circumference of the operation part 20, rotation is restricted while a body of the operation part 20 is inserted into the insertion hole part 12.

The operation part 20 is installed in the insertion hole part 12 of the glass part 10 installed in front of the display unit 15. Further, a stepped portion may be additionally formed at the circumference of the operation part 20 to limit the depth of insertion into the insertion hole part 12.

The operation part 20 is connected to a control unit by an electrical wire to transmit an operation signal, and the operation part 20 and the insertion hole part 12 are formed in a circular shape and may also be formed in a polygonal shape including a quadrangle or a triangle. The operation part 20 according to a first embodiment is formed in a circular shape and extends vertically.

The operation part 20 may be a button that has a circular cross section and extends vertically and may have a cross section having a polygonal shape including a quadrangle, or the shape of the operation part 20 may be changed to one of various shapes such as an ellipse and a triangle.

Further, restraint groove parts 22 by which the first locking part 50 and the second locking part 60 are caught are formed in the circumference of the operation part 20. The restraint groove parts 22 according to the first embodiment are formed in side surfaces of the operation part 20 facing a first restraint part 54 and a second restraint part 64.

Thus, when the first restraint part 54 and the second restraint part 64 are inserted into and caught by the restraint groove parts 22, the operation part 20 does not fall out of the insertion hole part 12 of the glass part 10.

The frame part 30 may be modified into any shape without departing from the technical spirit of having an inner hole part into which the operation part 20 is inserted. The frame part 30 according to one embodiment includes a base part 32 that is located below the glass part 10 and has the inner hole part at a position facing the insertion hole part 12 and an extension frame part 35 which extends from the base part 32 and in which the rotation part 40 is rotatably installed.

The base part 32 includes a first base 33 located on one side (upper side of FIG. 2) of the first locking part 50 and the second locking part 60 and a second base 34 located on the other side (lower side of FIG. 2) of the first locking part 50 and the second locking part 60. A pair of rotation connection parts 70 are rotatably installed between the first base 33 and the second base 34.

The extension frame part 35 includes a first extension frame 36 located on one side (upper side in FIG. 2) of the rotation part 40 and a second extension frame 37 located on the other side (lower side in FIG. 2) of the rotation part 40. The rotation part 40 is rotatably installed between the first extension frame 36 and the second extension frame 37.

The rotation part 40 is rotatably installed in the frame part 30 and may be variously modified without departing from the technical spirit of being rotated by an external force to move the first locking part 50 and the second locking part 60. The rotation part 40 according to one embodiment includes a rotary shaft 42 rotatably installed in the frame part 30, a rotation body 44 having a plate shape connected to the rotary shaft 42 and rotatably connected to the link member 80, and a knob member 46 that is installed in a curved shape extending from the rotation body 44 and is rotated by receiving an external force.

The rotary shaft 42 extending vertically from a rotation center of the rotation body 44 made of a disk is rotatably installed in the extension frame part 35. Since the knob member 46 extending from the rotation body 44 extends outward from the mounting housing part 17, the operator may rotate the knob member 46 while holding the knob member 46, and an external force generated by operating a separate driving part may be transferred to the knob member 46.

The first locking part 50 is connected to the rotation part 40 by the link member 80 and may be variously modified without departing from the technical spirit of being detachably attached to one side of the operation part 20 by moving together with the link member 80. The first locking part 50 according to one embodiment includes a first locking body 52 installed in a shape surrounding one side of the operation part 20 and having both ends rotatably connected to the rotation connection part 70, the first restraint part 54 protruding from the first locking body 52 and caught by the restraint groove parts 22 provided on the side surface of the operation part 20, and a side extension part 56 extending from the first locking body 52 and caught by the restraint groove parts 22 provided on the side surface of the operation part 20.

The first locking body 52 extends in a plate shape surrounding one side of the operation part 20, and both free ends of the first locking body 52 are rotatably installed in the rotation connection part 70. An end of the first locking body 52 is provided with a long hole into which a first support protrusion 74 of the rotation connection part 70 is to be inserted.

Further, the first restraint part 54 having a protrusion shape protruding inward from the first locking body 52 is inserted into the restraint groove part 22 of the operation part 20 to restrict the movement of the operation part 20.

The side extension part 56 extending to the side surface of the first locking body 52 is connected to the rotation body 44 through the link member 80. One side of the link member 80 is rotatably installed in the side extension part 56, and the other side of the link member 80 is rotatably installed at a position spaced apart from the rotation center of the rotation body 44.

The second locking part 60 is installed at a position opposite to the first locking part 50 with the operation part 20 interposed therebetween and may be variously modified without departing from the technical spirit of being detachably attached to the other side of the operation part 20 by moving together with the first locking part 50. The second locking part 60 according to one embodiment includes a second locking body 62 installed in a shape surrounding the other surface of the operation part 20 and having both ends rotatably connected to the rotation connection parts 70 and a second restraint part 64 protruding from the second locking body 62 and caught by the restraint groove part 22 provided on the side surface of the operation part 20.

The second locking body 62 extends in a plate shape surrounding the other side of the operation part 20, and both free ends of the second locking body 62 are rotatably installed in the rotation connection part 70. An end of the second locking body 62 is provided with a long hole into which a second support protrusion 76 of the rotation connection part 70 is to be inserted.

Further, the second restraint part 64 having a protrusion shape protruding inward from the second locking body 62 is inserted into the restraint groove part 22 of the operation part 20 to restrict the movement of the operation part 20.

The movement directions of the first locking part 50 and the second locking part 60 are set according to the rotational direction of the rotation part 40, and the first locking part 50 and the second locking part 60 are moved in a direction of becoming closer to each other or being spaced apart from each other with the operation part 20 interposed therebetween and restrain the movement of the operation part 20 or release the locking of the operation part 20.

The rotation connection part 70 is rotatably installed in the frame part 30 and may be various modified without departing from the technical spirit in which the first locking part 50 and the second locking part 60 are rotatably connected. The rotation connection part 70 according to one embodiment includes a rotation connection body 72 rotatably installed on the frame part 30, a first support protrusion 74 which protrudes from the rotation connection body 72 and in which the first locking body 52 is rotatably installed, and a second support protrusion 76 which protrudes from the rotation connection body 72 and in which the second locking body 62 is rotatably installed.

Since the first support protrusion 74 and the second support protrusion 76 are installed in opposite directions with respect to the rotation center axis of the rotation connection body 72, the first locking part 50 and the second locking part 60 may be moved in opposite directions by the rotation of the rotation connection body 72.

The rotation connection body 72 has a plate shape located between two ends of the first locking part 50 and the second locking part 60 facing each other, and the first support protrusion 74 and the second support protrusion 76 protruding from the rotation connection body 72 are rotatably connected to the first locking part 50 and the second locking part 60.

A rotation connection shaft 78 provided in the rotation center of the rotation connection body 72 extends vertically and is rotatably connected to the first base 33 and the second base 34.

Hereinafter, an operation state of the operating device 1 according to one embodiment of embodiments of the present invention will be described in detail with reference to the accompanying drawings.

As illustrated in FIG. 5, when the operation part 20 is unlocked, the knob member 46 of the rotation part 40 is rotated in a forward direction (clockwise direction in FIG. 5). By rotating the rotation body 44, the link member 80 connected to the rotation body 44 moves the first locking part 50 in a direction away from the operation part 20.

Since the first locking part 50 and the rotation connection part 70 are connected, the rotation connection part 70 is rotated by moving the first locking part 50. Due to the rotation of the rotation connection part 70, the second locking part 60 connected to the rotation connection part 70 is also moved in a direction away from the operation part 20.

Thus, since the first restraint part 54 and the second restraint part 64 are separated from the restraint groove parts 22 of the operation part 20, the operation part 20 is unlocked. Thus, the operator extracts the operation part 20 from the glass part 10 and then may perform a maintenance operation.

Further, when the movement of the operation part 20 is restricted, the knob member 46 of the rotation part 40 is rotated in a reverse direction (counterclockwise direction in FIG. 4). By rotating the rotation body 44, the link member 80 connected to the rotation body 44 moves the first locking part 50 in a direction toward the operation part 20.

Since the first locking part 50 and the rotation connection part 70 are connected, the rotation connection part 70 is rotated by moving the first locking part 50. Due to the rotation of the rotation connection part 70, the second locking part 60 connected to the rotation connection part 70 is also moved in a direction toward the operation part 20.

Thus, since the first restraint part 54 and the second restraint part 64 are inserted into the restraint groove parts 22 of the operation part 20, the movement of the operation part 20 is restrained.

As described above, according to embodiments of the present invention, by rotating the rotation part 40, the first locking part 50 and the second locking part 60 are moved, and thus the restraint of the operation part 20 is easily released. Therefore, maintenance costs can be reduced and working times can be shortened. Further, since only the operation part 20 may be separated from the glass part 10 and repaired or replaced, an operation of moving the glass part 10 together with the operation part 20 is omitted, and thus maintenance cost and work time of the operation part 20 can be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An operating device comprising:
   an operation part inserted into an insertion hole part of a glass part;
   a frame part having an inner hole part into which the operation part is inserted;
   a rotation part rotatably installed in the frame part;
   a first locking part connected to the rotation part by a link member and moving together with the link member to be detachably attached to one side of the operation part,
   a second locking part installed at a position opposite to the first locking part with the operation part interposed therebetween and moving together with the first locking part to be detachably attached to the other side of the operation part; and
   a rotation connection part which is rotatably installed in the frame part and to which the first locking part and the second locking part are rotatably connected.

2. The operating device of claim 1, wherein the frame part includes:
   a base part located below the glass part and having the inner hole part at a position facing the insertion hole part; and
   an extension frame part which extends from the base part and in which the rotation part is rotatably installed.

3. The operating device of claim 1, wherein the rotation part includes:
   a rotary shaft rotatably installed in the frame part;
   a rotation body which has a plate shape connected to the rotary shaft and to which the link member is rotatably connected; and
   a knob member which is installed in a curved shape extending from the rotation body and configured to rotate by receiving an external force.

4. The operating device of claim 1, wherein the first locking part includes:
   a first locking body which is installed to surround one side surface of the operation part and has both ends rotatably connected to the rotation connection part;
   a first restraint part that protrudes from the first locking body and is caught by restraint groove parts provided in side surfaces of the operation part; and
   a side extension part which extends from the first locking body and to which the link member is rotatably connected.

5. The operating device of claim 4, wherein the second locking part includes:
   a second locking body which is installed to surround the other surface of the operation part and has both ends rotatably connected to the rotation connection part; and
   a second restraint part that protrudes from the second locking body and is caught by the restraint groove parts provided in the side surfaces of the operation part.

6. The operating device of claim 5, wherein movement directions of the first locking part and the second locking part are set according to a rotation direction of the rotation part, and the first locking part and the second locking part are moved in a direction of becoming closer to each other or being spaced apart from each other with the operation part interposed therebetween.

7. The operating device of claim 5, wherein the rotation connection part includes:
   a rotation connection body rotatably installed in the frame part;
   a first support protrusion which protrudes from the rotation connection body and in which the first locking body is rotatably installed; and
   a second support protrusion which protrudes from the rotation connection body and in which the second locking body is rotatably installed.

8. The operating device of claim 7, wherein the first support protrusion and the second support protrusion are installed in opposite directions with respect to rotation center axis of the rotation connection body.

* * * * *